(12) United States Patent
Kawamura et al.

(10) Patent No.: US 6,271,882 B1
(45) Date of Patent: Aug. 7, 2001

(54) TV CAMERA LENS DEVICE

(75) Inventors: Hiroyuki Kawamura; Hiroshi Mizumura, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 08/936,540

(22) Filed: Sep. 24, 1997

(30) Foreign Application Priority Data

Sep. 24, 1996 (JP) .................................................. 8-251983
Nov. 12, 1996 (JP) .................................................. 8-300213

(51) Int. Cl.$^7$ .......................... H04N 5/225; G03B 17/00; G03B 3/10; G02B 15/22
(52) U.S. Cl. .......................... 348/335; 348/358; 396/79; 396/132; 359/693; 359/705
(58) Field of Search .................................... 348/335, 347, 348/358, 357; 396/76, 85, 86, 72, 73, 75, 89, 132, 79, 103; 359/693, 705, 823, 703, 694, 822

(56) References Cited

U.S. PATENT DOCUMENTS

| | | | |
|---|---|---|---|
| 4,198,126 | * 4/1980 | Abe et al. .............................. | 359/693 |
| 4,591,244 | * 5/1986 | Aono et al. ........................... | 359/693 |
| 4,769,711 | * 9/1988 | Date ..................................... | 348/335 |
| 5,144,492 | * 9/1992 | Lijima et al. .......................... | 396/85 |
| 5,327,188 | * 7/1994 | Kohmoto ............................. | 396/103 |
| 5,416,519 | * 5/1995 | Ohtake ................................. | 348/347 |

FOREIGN PATENT DOCUMENTS

| | | | |
|---|---|---|---|
| 58-1401 | 1/1983 | (JP) | ................................. G02B/7/04 |
| 60-46405 | 10/1985 | (JP) | ................................. G02B/7/04 |
| 05-236323 | * 9/1993 | (JP) | ................................. H04N/5/232 |
| 07-159667 | * 6/1995 | (JP) | ................................. G02B/7/08 |

* cited by examiner

*Primary Examiner*—Andrew B. Christensen

(57) ABSTRACT

A TV camera lens device includes a flange back length control signal for moving a master lens group to a position of the proper flange back length in accordance with the operation of a flange back length control. It further includes a macro control signal generating device for outputting a macro control signal for moving the master lens group to a preset macro position where the master lens group is to be positioned during the macro-shooting. Then, either one of the flange back length control signal and the macro control signal is made to take preference in accordance with the operation of a selector switch, and the selected control signal is input to a control circuit. Incidentally, the macro position may be relatively defined as referenced from the position of the proper flange back length.

3 Claims, 5 Drawing Sheets

TV CAMERA LENS DEVICE

BACKGROUND OF THE INVENTION

1. Field of the Invention

The present invention relates to a TV camera lens device, and more particularly to a technique of controlling a TV camera lens which is capable of forming an optical system in which a macro-shooting can be performed by moving the whole of a master lens group or a part thereof along an optical axis.

2. Description of Related Art

In a zoom lens applied in a broadcast TV camera, one of the whole of a master lens group in a taking lens system and a part of the master lens group is moved forward and backward along the optical axis to adjust the flange back length, thereby forming a sharp image of an object on a picture screen. Japanese Patent Publication Nos. 58-1401 and 60-46405 disclose TV camera lenses in which the master lens group, which is the identical master lens group that is moved forward and backward along the optical axis to adjust the flange back length, is moved forward and backward along the optical axis to form an optical system for the macro-shooting.

Further, such TV camera lenses are known where the master lens group is divided into two groups including a macro lens group, which is moved and controlled during the macro-shooting, and another lens group for adjusting the flange back length, which is moved and controlled during the flange back length adjustment. During the macro-shooting, the macro lens group, which is a part of the master lens group, is moved and controlled. During the flange back length adjustment, the lens group for adjusting the flange back length, which is a part of the master lens group, is moved and controlled.

In general, a rotary adjustment knob is provided on one side of the mount frame (the right side viewed from the front, i.e. the left side of a user) so that rotational force of the adjustment knob can be transmitted to a master lens driving mechanism in a lens mount via a power transmission mechanism such as an assembly of gears. If the user turns the adjustment knob by hand, an image formation position of the TV camera lens can be finely adjusted and the macro-shooting can be performed.

In the TV camera lens in which the master lens group is moved to perform both the flange back length adjustment and the macro-shooting, however, since the normal shooting is usually performed after the flange back length adjustment is completed, and a knob or the like is operated on demand to changeover to the macro-shooting, there is a problem that the operation becomes troublesome. Further, it is difficult to correctly return the master lens group to the initially-adjusted position of the proper flange back length when the shooting is switched from the macro-shooting to the normal shooting.

Similarly, also in the TV camera lens in which the macro lens group or the lens group for adjusting the flange back length, both of which are parts of the master lens group, is moved and controlled, respectively, to perform the macro-shooting or the flange back length adjustment, it is necessary to correctly return the macro lens group to the initially-adjusted position, particularly to the normal shooting position in the balance with the flange back length adjustment, when the macro lens group is moved to a macro-shooting position or a normal shooting position.

Furthermore, since it is desirable that the flange back length is precisely adjusted, the flange back length is frequently adjusted every time the shooting is performed. As for the macro position, there are such characteristics that a standard macro position is preset on manufacturing and the adjustment in focusing can be performed by a zoom lens.

SUMMARY OF THE INVENTION

The present invention has been developed in view of the above described circumstance and has as its object the provision of a TV camera lens device, which is capable of correctly moving a master lens group to a preset macro position during the macro-shooting after adjusting a flange back length and capable of correctly and repeatedly returning the master lens group to a once adjusted position of a proper flange back length after the macro-shooting.

To achieve the above-described object, according to the present invention, a TV camera lens device in which one of the whole of a master lens group arranged in a lens mount and a part of the master lens group is moved forward and backward along an optical axis whereby an optical system capable of performing a macro-shooting can be formed, and a macro position, at which the one of the whole of the master lens group and the part of the master lens group is positioned during the macro-shooting, is preset, the driving device comprises: a macro control signal generating device for outputting a macro control signal for moving the one of the whole of the master lens group and the part of the master lens group to the preset macro position; and a lens driving device for moving the one of the whole of the master lens group and the part of the master lens group forward and backward along the optical axis in accordance with the macro control signal from the macro control signal generating device.

According to the present invention, in performing the macroshooting, the whole of the master lens group or a part thereof can be moved to the preset macro position in accordance with the macro control signal.

The TV camera lens device of the present invention further comprises: a flange back length control signal generating device for outputting a flange back length control signal for moving the whole of the master lens group to a position of a proper flange back length in accordance with an operation of an external operating member; a selecting device for selecting the performance of the macro-shooting; and a control changeover device for invalidating the flange back length control signal from the flange back length control signal generating device and making the lens driving device controllable in accordance with the macro control signal from the macro control signal generating device in a case where the performance of the macro-shooting is selected by the selecting device, and for invalidating the macro control signal from the macro control signal generating device and making the lens driving device controllable in accordance with the flange back length control signal from the flange back length control signal generating device in a case where the performance of the macro-shooting is not selected by the selecting device.

With this arrangement, the flange back length control signal generating device for instructing the position of the proper flange back length and the macro control signal generating device for instructing the macro position are provided separately from one another, whereby the position of the proper flange back length and the macro position can be set independently of one another. The flange back length can be suitably adjusted by operating the external operating member while a state of focusing is confirmed by a view finder or the like every time the shooting is performed. As for the macro position, the standard macro position is preset on manufacturing or the like, and the fixed macro position which is preset is instructed by the macro control signal generating device. Then, depending upon the operation of the selecting device, out of those including the flange back length control signal generating device and the macro control signal generating device, either one control signal from the two means is validated and the other is invalidated.

That is, at the time of adjusting the flange back length, a command from the flange back length control signal generating device is validated by device of the selecting means, and the master lens group is adjusted to the position of the proper flange back length by operating the external operating members. Thereafter, at the time of macro-shooting, a command from the macro control signal generating device is validated by means of the selecting device, and the master lens group is moved to the preset macro position. At this time, the flange back length control signal generating device retains the state of instructing when the master lens group is adjusted to the position of the proper flange back length. Thus, after the macro-shooting is complete and the flange back length control signal generating device is validated again by device of the selecting device, the master lens group returns to the position of the proper flange back length which was previously adjusted. Hence, the user can easily adjust the flange back length and perform the macro-shooting. After the macro-shooting, the master lens group can be correctly and repeatedly returned to the position of the proper flange back length, which was once adjusted.

The TV camera lens device of the present invention is characterized in that; the master lens group includes a macro lens group which is moved and controlled during the macro-shooting and a lens group for adjusting a flange back length which is moved and controlled independently of the macro lens group.

With this arrangement, the TV camera lens in which the macro lens group and the lens group for adjusting the flange back length are controlled independently of one another in the master lens group can be countered.

Furthermore, the macro position may be relatively set as referenced from the position of the proper flange back length instead of setting a predetermined position in advance.

That is, in order to achieve the above-described object, according to the present invention, a TV camera lens device in which a master lens group arranged in a lens mount is moved forward and backward along an optical axis whereby a flange back length can be adjusted, the master lens group is moved forward and backward along the optical axis whereby an optical system capable of performing a macro-shooting can be formed, and a macro position, at which the master lens group is positioned during the macro-shooting, is preset and represented with a macro move direction and a macro move distance, the master lens group moving in the macro move direction by the macro move distance when moving from a position of a proper flange back length to the macro position, the driving device comprises: a lens driving device for moving the master lens group forward and backward along the optical axis in accordance with an input control signal; a flange back length control signal generating device for outputting a flange back length control signal for moving the master lens group to the position of the proper flange back length in accordance with an operation of an external operating member; a macro control signal generating device for outputting a macro control signal for moving the master lens group in the macro move direction by the macro move distance; a selecting device for selecting the performance of the macro-shooting; and a control changeover device, including signal adding device for adding the flange back length control signal from the flange back length control signal generating device and the macro control signal from the macro control signal generating device, for adding the flange back length control signal and the macro control signal by the signal adding device and making the lens driving means controllable in accordance with the added control signal in a case where the performance of the macro-shooting is selected by the selecting device, and for invalidating the macro control signal from the macro control signal generating device and making the lens driving device controllable in accordance with the flange back length control signal from the flange back length control signal generating device in a case where the performance of the macro-shooting is not selected by the selecting device.

According to the present invention, in a case where the macro position is defined by a relative positional relationship with the position of the proper flange back length, a control signal is generated by the macro control signal generating device for instructing a moving direction and a moving distance as referenced from the position of the proper flange back length. During the macro-shooting, the macro control signal from the macro control signal generating device and the flange back length control signal from the flange back length control signal generating device are added, and the macro position is instructed with the added control signal. Thus, the master lens group can be positioned at the suitable macro position in accordance with the position of the proper flange back length.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

This invention will be described in further detail by way of example with reference to the accompanying drawings.

Figure 1:
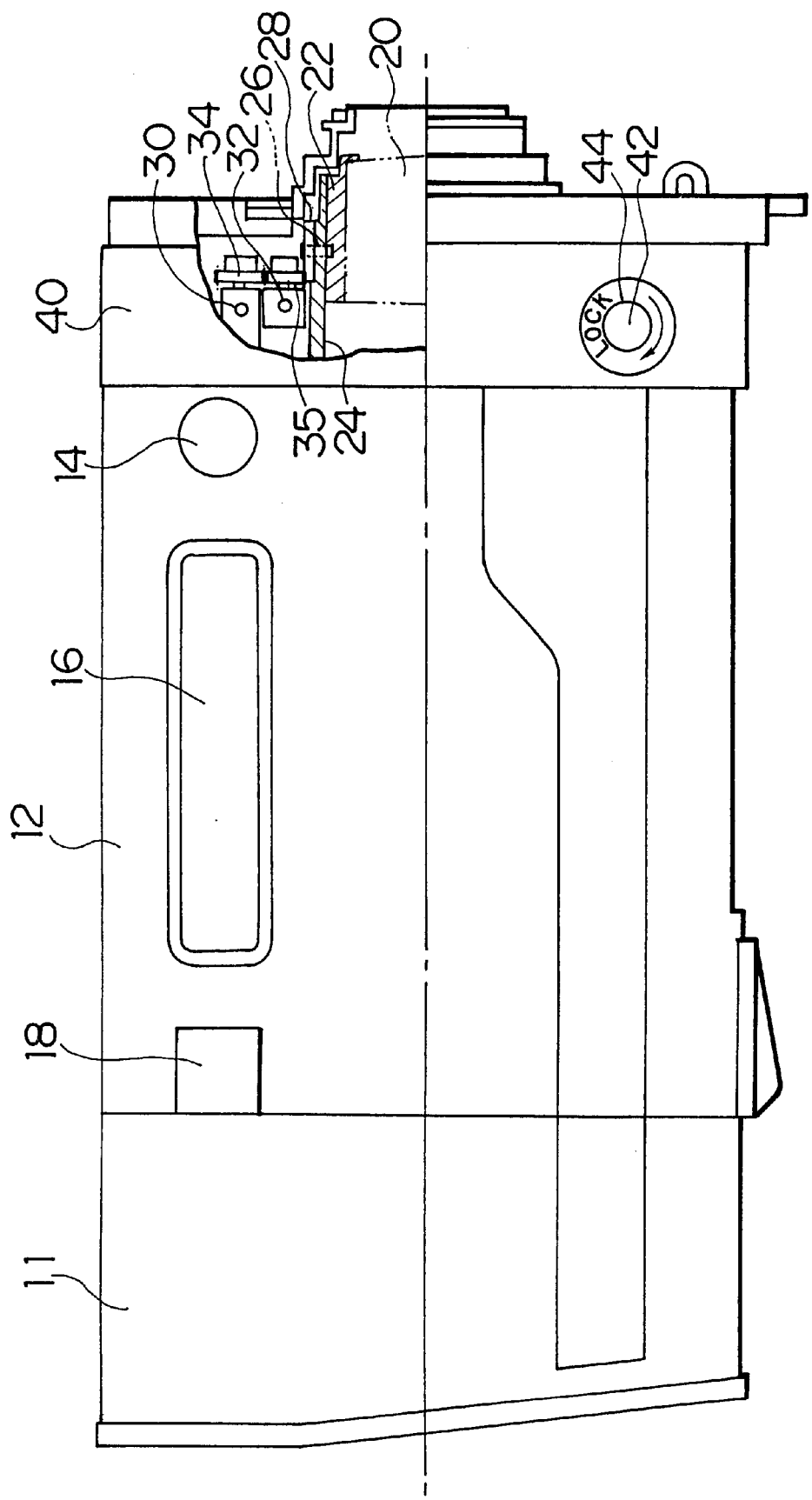
FIG. 1 is a side view of a TV camera lens according to the present invention.

FIG. 1 is a side view showing a TV camera lens, to which is applied the present invention, and particularly to an example, in which the whole of a master lens group is moved forward and backward along an optical axis so that the flange back length adjustment and macro-shooting can be performed. Further it partially illustrates the inner structure of the TV camera lens. The front part of a lens body is covered with a hood 11 at the left of the drawing. A TV camera is connected and fixed to the lens body on a right end face in the drawing. The lens body is covered with a substantially rectangular-parallelepiped cover 12, which is detachably fixed to the lens body via screws 14 provided at the right and left sides of the TV camera lens. A recessed portion 16 is formed at the center of the upper part of the side of the cover 12, and the recessed portion 16 is grasped when the TV camera lens is carried. A tally lamp window 18 is formed in front of the recessed portion 16.

Although the inner structure of the lens body is not illustrated in detail, there are successively provided from the front, a fixed focus lens group, a movable focus lens group, a first movable zoom lens group, a second movable zoom lens group, a master lens group 20, and the like on a lens mount of the lens body.

A master lens mount 22 holds the master lens group 20, and the master lens group 20 is connected to the end of a fixed lens mount 24 in such a manner as to be movable in forward and backward directions. A guide hole is formed on a peripheral face of the fixed lens mount 24, and the guide hole is parallel to the optical axis. A pin 26 is attached to the master lens mount 22, and the pin 26 is inserted into the guide hole. A cam cylinder 28 is rotatably attached to the outer peripheral face of the fixed lens mount 24, and a cam groove having a predetermined width is formed on the cam cylinder 28 diagonally with respect to the optical axis. The pin 26 of the master lens mount 22 engages with the cam groove.

The lens body is also provided with a drive motor 30 for driving the master lens group 20, and a potentiometer 32 for determining the position of the master lens group 20. A driving force of the motor 30 is transmitted to the cam cylinder 28 via gears 34, 35. When the cam cylinder 28 rotates, the master lens mount 22 moves forward and backward with respect to the fixed lens mount 24. According to the rotating amount of the cam cylinder 28, the potentiometer 32 outputs a position determination signal representing the determined position of the master lens group 20.

A flange back length control 42 for adjusting a flange back length of the TV camera lens is provided at the lower part of the side of a mount frame 40. The flange back length control 42 is provided with a potentiometer (not shown) which outputs a position control signal according to the turning amount of the flange back length control 42. The output position control signal is input to a control circuit 52 (shown in FIG. 2), and the control circuit 52 outputs a servo signal to drive the motor 30 according to the position control signal. When the motor 30 rotates, the rotational force is transmitted to the potentiometer 32 and the cam cylinder 28 via the gears 34, 35, so that the master lens mount 22 can move forward and backward along the optical axis.

Thus, by turning the flange back length control 42, the master lens group 20 can move forward and backward along the optical axis, and thereby an image-formation position of the TV camera lens can be adjusted on a picture screen of the TV camera. That is, the flange back length of the TV camera lens can be adjusted. Moreover, the master lens group 20 can be set at a proper position for the macro-shooting.

A fixing knob 44 is provided coaxially with the flange back length control 42. The fixing knob 44 locks the flange back length control 42 so as to prevent the flange back length adjusted with the flange back length control 42 from changing. That is, after the flange back length control 42 is turned to adjust the position of the master lens group 20, the fixing knob 44 is turned clockwise to fix the rotational axis of the flange back length control 42, thereby preventing the previously-adjusted position of the master lens group 20 from shifting due to unexpected external force.

Next, an explanation will be given about a drive control system of the master lens group.

Figure 2:
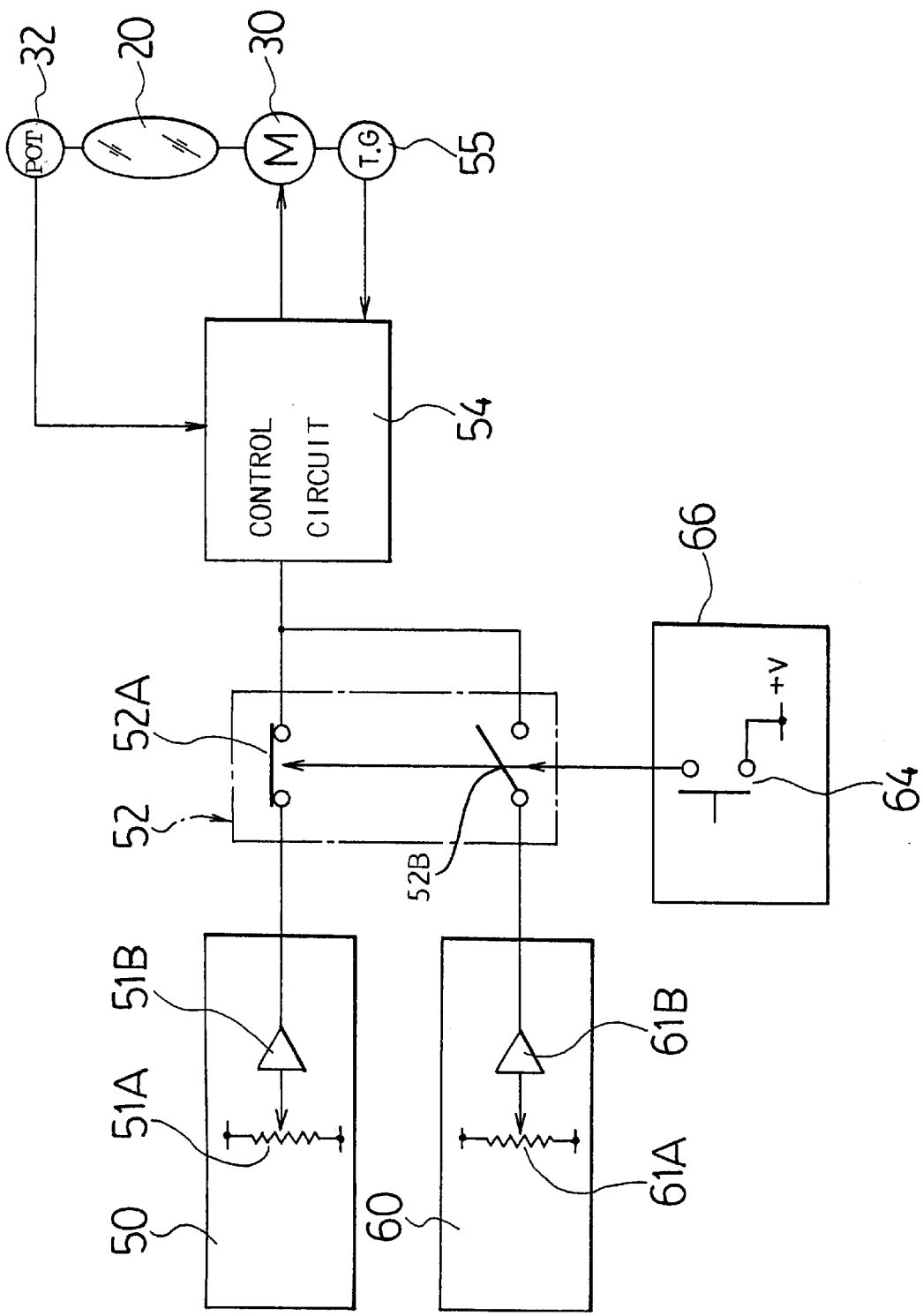
FIG. 2 is a block diagram illustrating the construction of a drive control system for a master lens group.

FIG. 2 is a block diagram illustrating the construction of the drive control system of the master lens group.

A flange back length control signal generating device 50 includes a potentiometer 51A and an amplifier 51B. When the flange back length control 42 is turned, the flange back length control signal generating device 50 outputs an electric signal representing a position to which the master lens group 20 moves, according to the turning amount of the flange back length control 42. The output electric signal is input to a control circuit 54 via a switch device 52.

The control circuit 54 outputs a servo signal according to the input electric signal so as to drive the motor 30. When the motor 30 rotates, the cam cylinder 28 rotates as stated previously, and the master lens group 20 moves forward and backward along the optical axis. The potentiometer 32 determines the position of the master lens group 20, and transmits the position determination signal representing the determined position of the master lens group 20 to the control circuit 54. The control circuit 54 compares the position determined by the potentiometer 32 and the position indicated by the flange back length control signal generating device 50, and when both correspond to one another, the control circuit 54 stops driving the motor 30. Thereby, the position control can be accurate.

A tachogenerator 55, which determines the number of rotations of the motor 30, is connected to the motor 30. The tachogenerator 55 transmits a signal representing the determined number of rotations to the control circuit 54, and the signal is used to rate-control the motor 30.

A macro control signal generating device 60 for generating a signal representing a macro position of the master lens group 20 is provided on the TV camera lens. The macro control signal generating device 60 includes a potentiometer 61A and an amplifier 61B.

A standard macro position, at which the master lens group 20 is positioned during the macro-shooting, is previously determined on the basis of a designed value, and the potentiometer 61A is set to output a macro control signal for moving the master lens group 20 to the macro position. The output macro control signal is input to the control circuit 54 via the switch device 52.

The switch device 52 is an interlocking switch, in which contact points are changed over in interlocking with a selector switch 64 for selecting the performance of the macro-shooting. The selector switch 64 is provided on a macro controller 66.

When the selector switch 64 is turned off, a contact piece 52A of the switch device 52 is closed and a contact piece 52B is opened. Thereby, the signal output from the flange back length control signal generating device 50 is input to the control circuit 54, and the signal from the macro control signal generating device 60 is invalidated.

On the other hand, when the selector switch 64 is turned on, the contact piece 52A of the switch device 52 is opened and the contact piece 52B is closed. Thereby, the signal output from the macro control signal generating device 60 is input to the control circuit 54, and the signal output from the flange back length control signal generating device 50 is invalidated.

An explanation will hereunder be given about the operation of the TV camera lens which is constructed in the above-mentioned manner.

Firstly, a standard macro position, at which the master lens group 20 is to be positioned during the macro-shooting, is preset, and the potentiometer 61A is set such that it can output a macro control signal for moving the master lens group 20 to the macro position.

Subsequently, the selector switch 64 of the macro controller 66 shown in FIG. 2 is in a state of being turned off, that is, a state of the macro-shooting being off. Thereby, the signal from the macro control signal generating device 60 is invalidated and the signal from the flange back length control signal generating device 50 becomes valid. In this condition, the master lens group 20 is set to the proper focusing position (the position of the proper flange back length) by turning the flange back length control 42 while the image-formation condition is observed through a view finder 72 of a TV camera 70 in FIG. 3. When the flange back length adjustment is completed, the fixing knob 44 is turned to fix the rotational axis of the flange back length control 42 so as to prevent the previously-adjusted position of the master lens group 20 from shifting due to unexpected external force, etc. .

Thereafter, in the normal shooting, the focusing is adjusted by manipulating a focus demand (a focus ring) 74 by the right hand to move the focus lens (the movable focus lens group). The zoom is adjusted by manipulating a zoom demand (a zoom ring) 76 by the left hand to move the zoom lens group (the first and second movable zoom lens groups) in a proper optical positional relationship. A focus controller including the focus ring 74 outputs a position control signal to drive the focus lens. On the other hand, a zoom controller including the zoom ring 76 outputs a rate control signal, and the zoom lens group is rate-controlled and driven according to the rate control signal.

When the macro-shooting is performed, the selector switch 64 of the macro controller 66 shown in FIG. 2 is turned on, and the signal from the macro control signal generating device 60 is made valid. At this time, although the signal from the flange back length control signal generating device 50 is disregarded, the position controlling status of the flange back length control signal generating device 50 is maintained where the previously-adjusted position of the master lens group 20 of the proper flange back length is represented.

Figure 3:
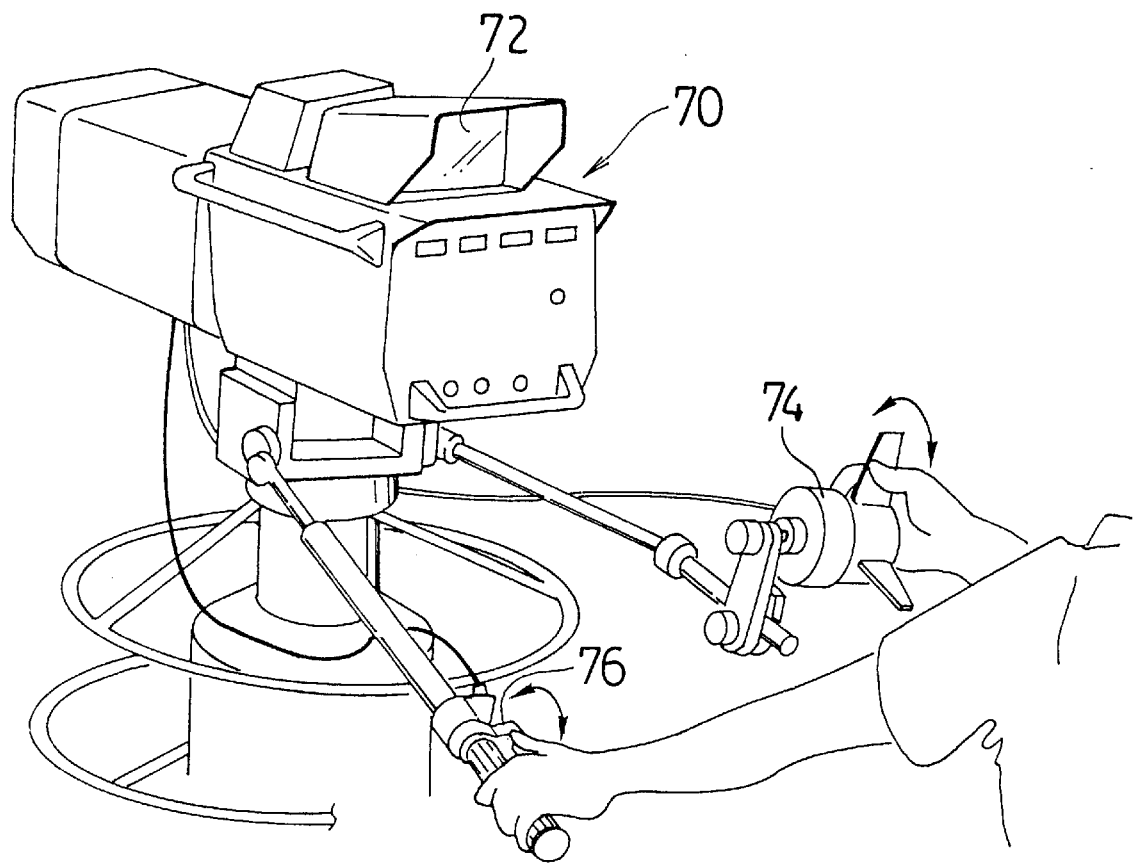
FIG. 3 is a perspective view describing the operation of the TV camera lens.

As described above, the signal representing the macro position is output from the macro control signal generating device 60 and the output signal is input to the control circuit 54, and thus the master lens group 20 is moved to the preset macro position. In the macro-shooting, the zoom ring 76 in FIG. 3 is operated in order to move the zoom lens group, so that the focusing can be adjusted.

On the other hand, since the flange back length control signal generating device 50 maintains the position controlling status where the previously-adjusted proper flange back length position of the master lens group 20 is represented, when the selector switch 64 of the macro controller 66 is turned to the macro-shooting off after the completion of the macro-shooting, the signal representing the proper flange back length position adjusted previously is input to the control circuit 54, and thereby the master lens group 20 returns to the position of the proper flange back length.

Thus, the user can easily perform the flange back length adjustment and the macro-shooting and can repeatedly and correctly return the master lens group after the macro-shooting to the position of the proper flange back length adjusted once.

In the above-described embodiment, the flange back length control signal and the macro control signal are described as the position control signals. However, the both can be made as rate control signals.

Furthermore, in the above-described embodiment, the case where the macro position is preset in no relation with the position of the proper flange back length is described. However, as shown below, the macro position may be defined in relative positional relationship referenced from the position of the proper flange back length.

Figure 4:
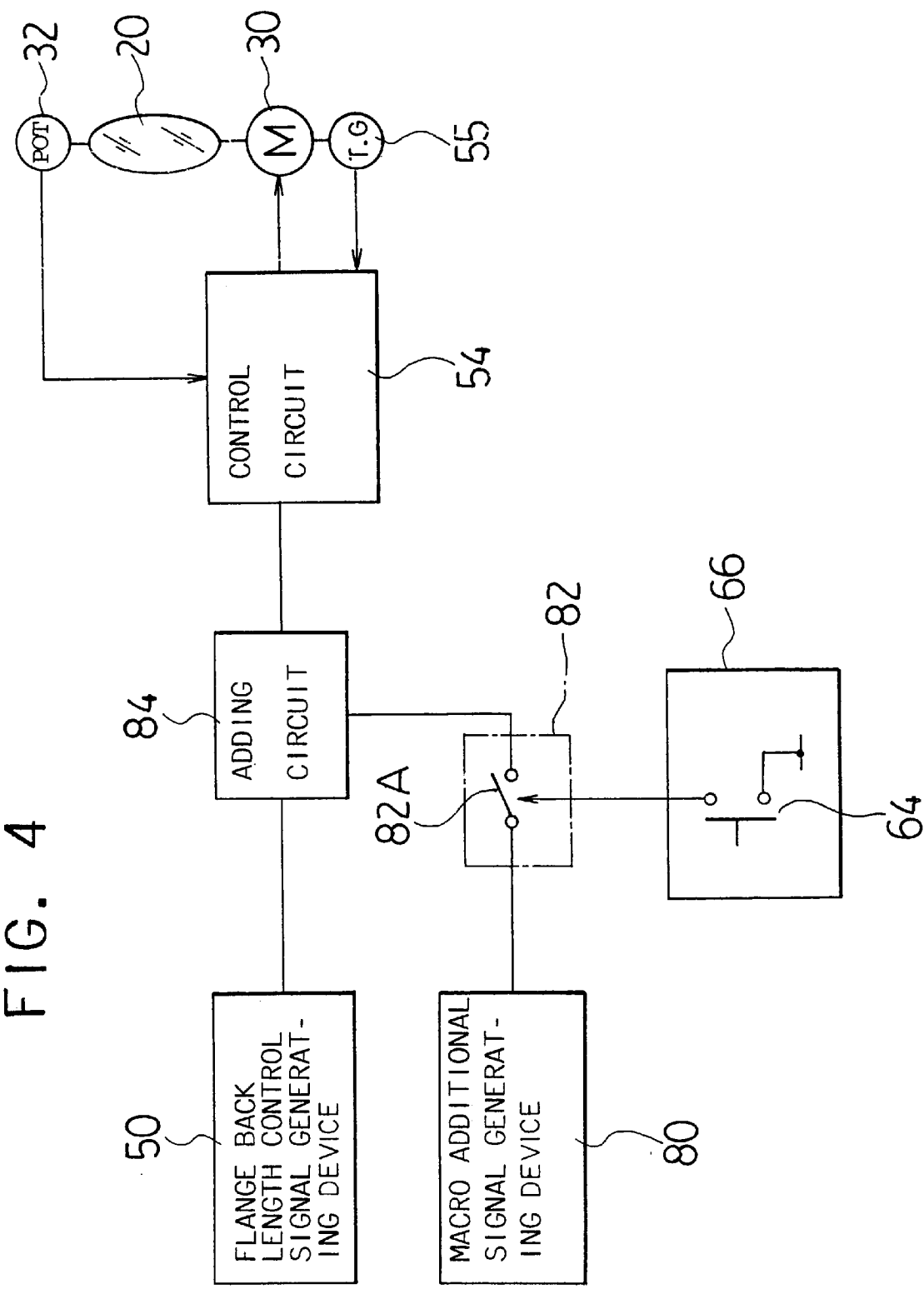
FIG. 4 is a block diagram illustrating another example of the drive control system for the master lens group.

FIG. 4 is a block diagram illustrating another example of the drive control system for the master lens group. Parts similar to those described with reference to FIGS. 1, 2 and 3 are denoted by the same reference numerals, and they will not be explained.

In this embodiment, the macro position is defined with a macro move direction, in which the master lens group moves when moving from the position of the proper flange back length to the macro position, and a macro move distance, by which the master lens group moves when moving from the position of the proper flange back length to the macro position. A macro additional signal generating device 80, which generates a macro additional signal representing the macro move direction and the macro move distance, is provided. The macro additional signal output from the macro additional signal generating device 80 is input to an adding circuit 84 via a switch device 82. The adding circuit 84 adds the macro additional signal and the flange back length control signal. Then, the added signal is input to the control circuit 54.

The switch device 82 is an interlocking switch, in which contact points are changed over in interlocking with the selector switch 64 of the macro controller 66. When the selector switch 64 is turned off, a contact piece 82A of the switch device 82 is opened, and thereby the signal from the macro additional signal generating device 80 is invalidated. In this case, only the signal output from the flange back length control signal generating device 50 is input to the control circuit 54. In this condition, the flange back length can be adjusted by turning the flange back length control 42. Then, after the flange back length is adjusted, the normal shooting can be performed.

On the other hand, when the selector switch 64 is turned on, the contact piece 82A of the switch device 82 is closed, and thereby the macro additional signal is input to the adding circuit 84. Then, the adding circuit 84 adds the flange back length control signal and the macro additional signal, and the added signal is input to the control circuit 54. Thus, the master lens group 20 is moved to the predetermined macro position referenced from the position of the proper flange back length.

After the completion of the macro-shooting, when the selector switch 64 of the macro controller 66 is turned off, the macro additional signal is invalidated, and only the flange back length control signal is input to the control circuit 54. Thereby, the master lens group 20 returns to the position of the proper flange back length which was adjusted previously.

Thus, the user can easily perform the flange back length adjustment and the macro-shooting and can repeatedly and correctly return the master lens group after the macro-shooting to the position of the proper flange back length adjusted once.

Furthermore, in the above-described embodiment, the case where the same master lens group is moved during the macro-shooting and during the flange back length adjustment is described. However, as shown below, the master lens group is divided into two groups, and the respective groups can be moved.

Figure 5:
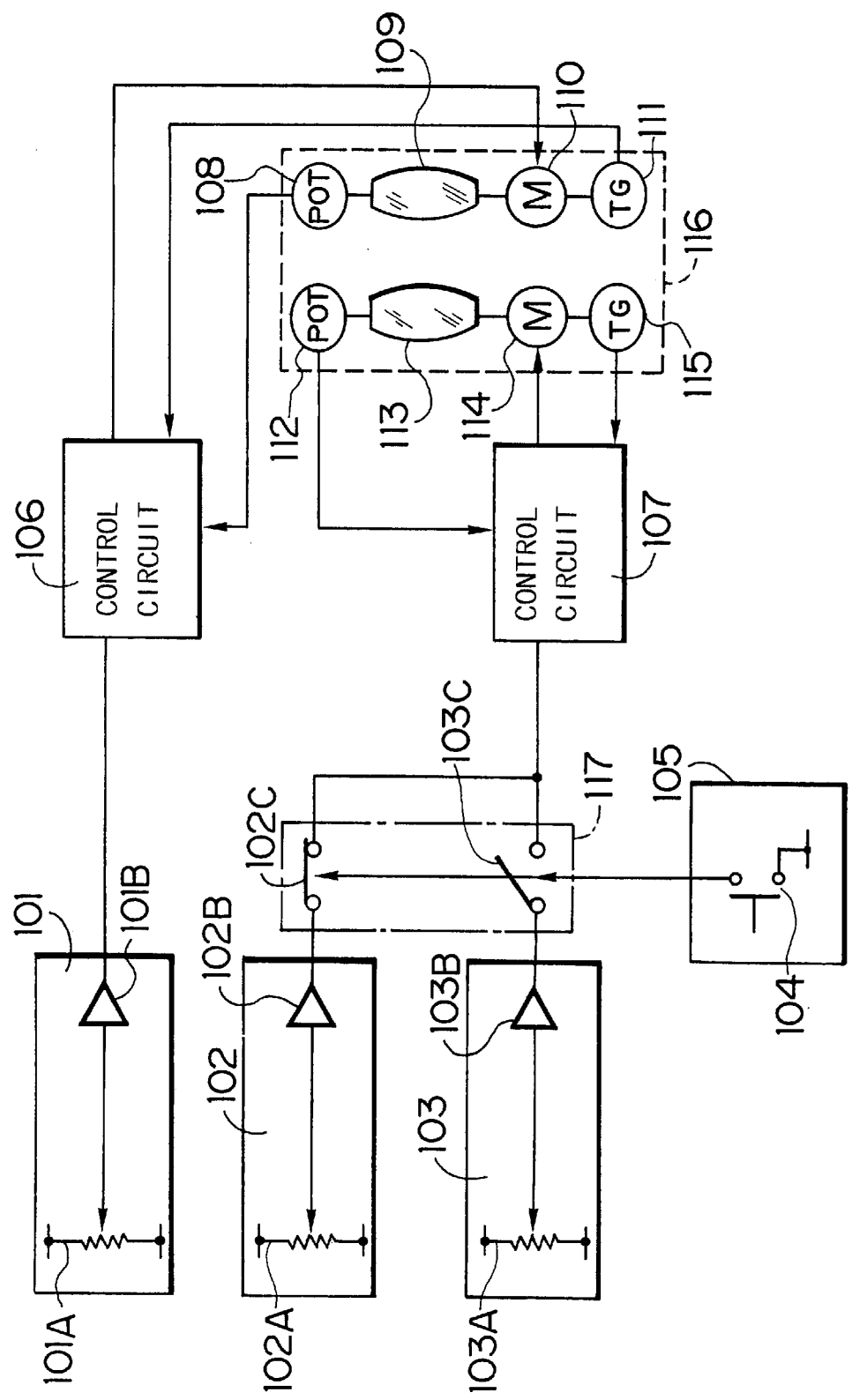
FIG. 5 is a block diagram illustrating an example of the construction of a drive control system for a divided master lens group.

FIG. 5 is a block diagram illustrating an example of the construction of a drive control system for a divided master lens group.

A flange back length control signal generating device 101 includes a potentiometer 101A and an amplifier 101B. When the flange back length control 42 shown in FIG. 1 is turned, the flange back length control signal generating device 101 outputs an electric signal representing a position to which a flange back length adjustment lens group 109 within a master lens group 116, according to the turning amount of the flange back length control 42. The output electric signal is input into a control circuit 106.

The control circuit 106 outputs a servo signal according to the input electric signal so as to drive a motor 110. When the motor 110 rotates, the force thereof is transmitted to the flange back length adjustment lens group 109 via a cam member (not shown), and thereby the flange back length adjustment lens group 109 is moved forward and backward along the optical axis and along a straight-lined groove (not shown). A potentiometer 108 determines the position of the flange back length adjustment lens group 109, and transmits the position determination signal representing the determined position of the flange back length adjustment lens group 109 to the control circuit 106. The control circuit 106 compares the position determined by the potentiometer 108 and the position indicated by the flange back length control signal generating device 101, and when both correspond to one another, the control circuit 106 stops driving the motor 110.

A tachogenerator 111, which determines the number of rotations of the motor 110, is connected to the motor 110. The tachogenerator 111 transmits a signal representing the determined number of rotations to the control circuit 106, and the signal is used to rate-control the motor 110.

On the TV camera lens, there are provided two signal generating device including a normal shooting position control signal generating device 102 for generating a signal representing a position to which a macro lens group 113 within the master lens group 116 moves and a macro control signal generating device 103. The normal shooting position control signal generating device 102 is used for setting a position of the macro lens group 113 in a normal shooting state defined at manufacturing, and includes a potentiometer 102A and an amplifier 102B. The potentiometer 102A is set to output a normal shooting position control signal for moving the macro lens group 113 to the normal shooting position. The output normal shooting position control signal is input to the control circuit 107 via a switch device 117.

The control circuit 107 outputs a servo signal according to the input normal shooting position control signal so as to drive a motor 114. When the motor 114 rotates, the force thereof is transmitted to the macro lens group 113 via a cam member (not shown), and thereby the macro lens group 113 is moved forward and backward along the optical axis and along a straight-lined groove (not shown). A potentiometer 112 determines the position of the macro lens group 113, and transmits the position determination signal representing the determined position of the macro lens group 113 to the control circuit 107. The control circuit 107 compares the position determined by the potentiometer 112 and the position indicated by the normal shooting position control signal generating device 102, and when both correspond to one another, the control circuit 107 stops driving the motor 114.

A tachogenerator 115, which determines the number of rotations of the motor 114, is connected to the motor 114. The tachogenerator 115 transmits a signal representing the determined number of rotations to the control circuit 107, and the signal is used to rate-control the motor 114.

The macro control signal generating device 103 is used for moving the macro lens group 113 at the preset macro position (previously determined position on the basis of the designed value) during the macro-shooting, and includes a potentiometer 103A and an amplifier 103B. The potentiometer 103A is set to output a macro control signal for moving the macro lens group 113 to the preset macro position. The output macro control signal is input to the control circuit 107 via the switch device 117. The switch device 117 is an interlocking switch, in which contact points are changed over in interlocking with a selector switch 104 for selecting the performance of the macro-shooting. The selector switch 104 is provided on a macro controller 105.

When the selector switch 104 is turned off, a contact piece 102C of the switch device 117 is closed and a contact piece 103C is opened. Thereby, the signal output from the normal shooting position control signal generating device 102 is input to the control circuit 107, and the signal from the macro control signal generating means 103 is invalidated.

On the other hand, when the selector switch 104 is turned on, the contact piece 102C of the switch device 117 is opened and the contact piece 103C is closed. Thereby, the signal output from the normal shooting position control signal generating device 102 is invalidated, and the signal output from the macro control signal generating device 103 is input to the control circuit 107.

An explanation will hereunder be given about the operation of the TV camera lens which is constructed in the above-mentioned manner.

Firstly, a case where the flange back length adjustment is performed is described. In this case, the macro lens group 113 is set at the normal shooting position which is determined by the normal shooting position control signal generating device 102. In this condition, the flange back length adjustment lens group 109 is set to the proper focusing position (the position of the proper flange back length) by turning the flange back length control 42 while the image-formation condition is observed through the view finder 72 of the TV camera 70 in FIG. 3. When the flange back length adjustment is completed, the fixing knob 44 is turned to fix the rotational axis of the flange back length control 42 so as to prevent the previously-adjusted position of the flange back length adjustment lens group 109 from shifting due to unexpected external force, etc.

Thereafter, in the normal shooting, the focusing is adjusted by manipulating the focus demand (the focus ring) 74 by the right hand to move the focus lens (the movable focus lens group). The zoom is adjusted by manipulating the zoom demand (the zoom ring) 76 by the left hand to move the zoom lens group (the first and second movable zoom lens groups) in a proper optical positional relationship. The focus controller including the focus ring 74 outputs a position control signal to drive the focus lens. On the other hand, the zoom controller including the zoom ring 76 outputs a rate control signal, and the zoom lens group is rate-controlled and driven according to the rate control signal.

When the macro-shooting is performed, the selector switch 104 of the macro controller 105 shown in FIG. 5 is turned on, and the signal from the macro control signal generating device 103 is made valid. At this time, although the signal from the normal shooting position control signal generating device 102 is disregarded, the position controlling status of the normal shooting position control signal generating device 102 is maintained where the previously-adjusted normal shooting position of the macro lens group 113 is represented.

As described above, the signal representing the macro position is output from the macro control signal generating device 103 and the output signal is input to the control circuit 107, and thus the macro lens group 113 is moved to the preset macro position. In the macro-shooting, the zoom ring 76 in FIG. 3 is operated in order to move the zoom lens group, so that the focusing can be adjusted.

On the other hand, since the normal shooting position control signal generating device 102 maintains the position controlling status where the normal shooting position of the macro lens group 113 determined at manufacturing is represented, when the selector switch 104 of the macro controller 105 is turned to the macro-shooting off after the completion of the macro-shooting, the signal representing the normal shooting position is input to the control circuit 107, and thereby the macro lens group 113 returns to the normal shooting position.

Thus, the user can easily perform the flange back length adjustment and the macro-shooting and can repeatedly and correctly return the macro lens group after the macro-shooting to the normal shooting position determined at manufacturing.

Incidentally, in this embodiment, the movement of the master lens group is performed under the construction, in which the cam groove and the cam cylinder are coupled to one another by the pin. However, a helicoid mechanism, which is the well-known technique in the lens driving, may be used.

As has been described hereinabove, with the device for driving the TV camera lens according to the present invention, in performing the macro-shooting, the whole of the master lens group or a part thereof can be moved to the predetermined macro-shooting position in accordance with the macro control signal.

Further, there are provided the flange back length control signal generating device outputting the flange back length control signal in accordance with the operation of the external operating member and the macro control signal generating device outputting the macro control signal for moving the master lens group to the preset macro position. Out of the flange back length control signal and the macro control signal, either one of the control signals is made to take preference and the other is invalidated. Thus, the user can easily perform the flange back length adjustment and the macro-shooting and repeatedly and positively return the master lens group to the position of the proper flange back length adjusted once, after the macro-shooting.

Furthermore, in the case where the macro position is defined by the relative positional relationship with the position of the proper flange back length, a control signal instructing a predetermined move direction and a predetermined move distance as referenced from the position of the proper flange back length by the macro control signal generating means is produced. Further during the macro-shooting, the macro signal from the macro control signal generating device is added to the flange back length control signal from the flange back length control signal generating device to instruct the macro position. Thus the master lens group can be positioned at the suitable position in accordance with the position of the proper flange back length.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens device for a TV camera comprising:
   a lens mount;
   a focus lens group arranged in the lens mount;
   a zoom lens group arranged in the lens mount;
   a master lens group arranged behind the zoom lens group in the lens mount, the master lens group forming an image on a picture screen of the TV camera, at least a part of said master lens group being moved to a preset macro position when a macro-shooting is performed with the TV lens device;
   a macro control signal generating device which generates a macro control signal to move the at least the part of said master lens group to the preset macro position;
   a lens driving device which moves the at least the part of said master lens group along an optical axis in accordance with the macro control signal applied from said macro control signal generating device;
   a flange back length control signal generating device which generates a flange back length control signal to move a whole of said master lens group to adjust a flange back length of the TV lens device in accordance with an operation of an external operating member;
   a selecting device which determines whether to perform the macro-shooting; and
   a control changeover device which, when the selecting device determines to perform the macro-shooting, invalidates the flange back length control signal and makes said lens driving device controllable in accordance with the macro control signal and which, when the selecting device determines not to perform the macro-shooting, invalidates the macro control signal and makes said lens driving device controllable in accordance with the flange back length control signal,
   wherein when the control changeover device makes the lens driving device controllable in accordance with the flange back length control signal, the lens driving device moves the whole of the master lens group along the optical axis in accordance with the flange back length control signal applied from the flange back length control signal generating device.

2. The TV lens device as defined in claim 1, wherein said master lens group includes:
   a macro lens group of which movement is controlled during the macro-shooting; and
   a flange back length adjusting lens group of which movement is controlled independently of said macro lens group.

3. A TV lens device for a TV camera comprising:
   a lens mount;
   a focus lens group arranged in the lens mount;
   a zoom lens group arranged in the lens mount;
   a master lens group arranged behind the zoom lens group in the lens mount, the master lens group forming an image on a picture screen of the TV camera, the master lens group being moved to adjust a flange back length of the TV lens device when a flange back length adjustment is performed, the master lens group being moved to a macro position when a macro-shooting is performed with the TV lens device;
   a lens driving device which moves said master lens group along an optical axis in accordance with a signal applied to the lens driving device;
   a flange back length control signal generating device which generates a flange back length control signal to move said master lens group to a flange back length position securing a proper flange back length of the TV lens device in accordance with an operation of an external operating member;

a macro control signal generating device which generates a macro control signal to move said master lens group from the flange back length position in a macro move direction by a macro move distance so as to locate the master lens group at the macro position, the macro move direction and the macro move distance being preset with respect to the flange back length position;

a selecting device which determines whether to perform the macro-shooting; and a control changeover device including a signal adding device which produces a sum signal by adding the flange back length control signal and the macro control signal, the control changeover device making said lens driving device controllable in accordance with the sum signal when the selecting device determines to perform the macro-shooting, the control changeover device invalidating the macro control signal and making said lens driving device controllable in accordance with the flange back length control signal when the selecting device determines not to perform the macro-shooting.

* * * * *